Sept. 25, 1928.
H. V. NYE
1,685,747
SYSTEM OF DISTRIBUTION
Filed March 3, 1924
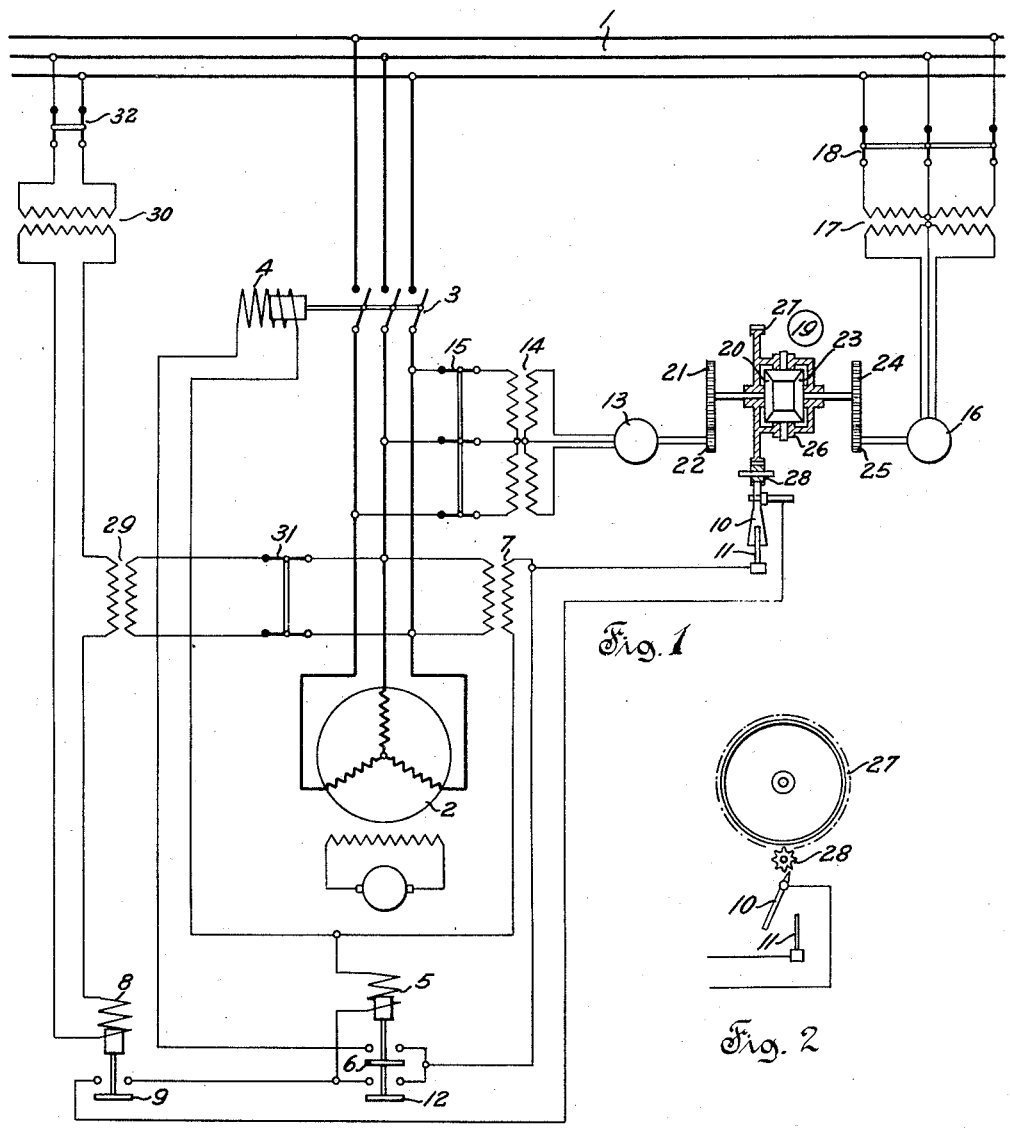
Fig. 1
Fig. 2
Fig. 3
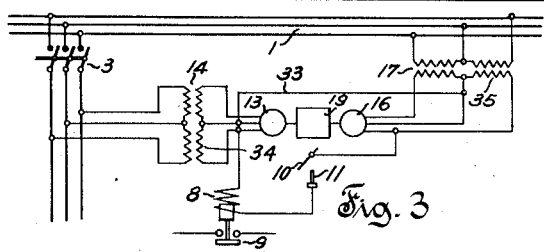
Inventor
H. V. Nye
by
Attorney Patented Sept. 25, 1928.

1,685,747

UNITED STATES PATENT OFFICE.

HENRY V. NYE, OF WEST ALLIS, WISCONSIN, ASSIGNOR TO ALLIS-CHALMERS COMPANY, OF MILWAUKEE, WISCONSIN, A CORPORATION OF DELAWARE.

SYSTEM OF DISTRIBUTION.

Application filed March 3, 1924. Serial No. 696,487.

This invention relates to systems of distribution. It relates more particularly to systems in which alternating current generators are employed and it is desired to connect a given generator to alternating current mains which are already energized from some other source. It is desirable in such a case that before the generator is connected to the mains that the frequency of the generator shall be substantially the same as the frequency of the mains. The permissible difference in frequencies depends, among other things, upon the relative sizes of the generator to be connected and those already connected to the mains. In certain cases a difference of two cycles, in a 60 cycle system, may be too much. In other cases a difference of not more than one or two per cent would be satisfactory, and in still others substantial equality would be desirable. Furthermore the electromotive forces of the generator and mains should be substantially in phase. It is an object of this invention to provide means whereby a generator may be connected to satisfy one or more of these conditions. It is a further object of the invention to provide a means which is particularly adapted to connect a generator to a distribution system which generator is driven by a prime mover the speed of which may be gradually, and in particular cases, automatically gradually increased, as desired. To this end the invention provides means whereby the generator may be connected to the mains as it approaches synchronous speed.

Still another object of the invention is the provision of a means for automatically connecting a generator to a distribution system, which is responsive to the difference in frequency between said system and said generator, and, more specifically, responsive to both the difference in frequency and the difference in phase therebetween.

Still another object of the invention is the provision of means for connecting a generator to a distribution system in an efficient and reliable way with a minimum of shock to these parts. Other objects will appear hereinafter as the description of the invention proceeds.

The novel features of this invention will appear from this specification and the accompanying drawings forming a part thereof and illustrating one embodiment of the invention, and all these novel features are intended to be pointed out in the claims.

In the accompanying drawings:—

Fig. 1 is a diagrammatic showing of a distribution system in which the invention has been applied.

Fig. 2 is a detail view.

Fig. 3 is a modification.

Referring to Fig. 1, a portion of the distribution system is here shown as comprising mains or buses 1, which under normal conditions will carry alternating current. A prime-mover-driven alternating current generator 2 is shown as connectible to the buses 1 by means of an electromagnetically operated main switch 3 having an operating coil 4. This operating coil 4 is here shown as controllable by a relay 5 adapted to close a contact 6 by which the coil 4 will be connected to the secondary of a shunt transformer 7. The primary of the transformer 7 may be connected across one of the phases of the generator.

Energization of relay 5 is here shown as controlled by two means one of which includes a relay 8 adapted to close a contact 9 in a circuit for the coil 5. The other means, in this instance, is a movable contact 10 cooperable with a stationary contact 11, the contact 10 being controlled by a frequency responsive means which will now be described.

The frequency responsive means is here shown as comprising a synchronous motor 13 fed from a transformer or transformers 14 connected to the phases of the generator 2 through a switch 15 which may or may not be automatically operable. A synchronous motor 16 is fed from a transformer or transformers 17 connected through a switch 18 to the buses 1. The switch 18 may or may not be automatically operable. There is also here shown a differential gearing 19 including an element or gear 20 driven by a gear 21 which is in turn driven by a pinion 22 associated with the motor 13. Another element or gear 23 of the differential gearing is driven by a gear 24 in turn driven by a pinion 25 associated with motor 16. A housing 26 carries the usual planetary gears meshing with gears 20—23. A gear 27 is here shown as carried by the housing 26 and this gear drives a pinion 28. Referring now to Fig. 2 it will be seen that the contact 10 is pivotally mounted in a suitable position with respect to the pinion 28 so that a tooth or projection associated with contact 10 and extending toward pinion 28 is adapted to be engaged by the teeth of that pinion. If the pinion 28 revolves in a counter-clockwise direction as viewed in Fig. 2 the contact 10 will be swung in a clockwise direction and maintained in a position such as shown. The motor 16 should revolve in such a direction that when said motor is operating and the motor 13 is not revolving that the contact 10 will be held in its open circuit position. It is clear that if the pinion 28 gradually decreases its motion in a counter-clockwise direction, then stops and rotates in a clockwise direction, that the contact 10 will be swung into engagement with contact 11.

It is apparent that if the ratios between gears 21—22 and gears 24—25 are the same that the gear 27 will remain stationary when motors 13 and 16 are running at the same speed. It is desired, however, that the contact 10 be closed somewhat before the motor 13 reaches the same speed as motor 16, in other words, before the frequency of the generator is exactly the same as that of the buses 1. One way in which this may be accomplished is to give the gears 21—22 a ratio of, for example, 100 to 10; the gears 24—25 a ratio of 102 to 10. The desired gear ratios would depend upon the rate of acceleration of the speed of the prime mover.

The relay 8 is made responsive to the difference in phase between the generator 2 and the buses 1 by suitably supplying it, as in Fig. 1, from a pair of transformers one of which 29 is connected through a switch 31, which may or may not be automatically operated, to one of the phases of the generator. The other transformer 30 is shown as connected through switch 32, which may or may not be automatically operated to the phase of buses 1 which when the switch 3 is closed will be connected to the same phase of the generator 2 as that to which transformer 29 is connected.

The operation of the system shown in Fig. 1 is as follows:—Assuming that the generator 2 is being gradually increased in speed by the prime mover and that the transformers 14, 17, 29 30 have been energized by the suitable closure of their controlling switches, the motor 16 will be operating at a speed corresponding to the frequency of the buses 1. The motor 13 will be gradually increasing in speed in proportion with the increase in speed and frequency of the generator 2 and by reason of the difference in gear ratios of the gears 21—22 and 24—25 the gear 27 will stand still when the frequency of the generator is a desired percentage less than that of the mains. The speed of motor 13 will keep on increasing and after a predetermined number of revolutions the pinion 28 will close contact 10. The contact 10 will therefore not close until not more than the desired difference in frequencies exists and somewhat before the frequency of the generator 2 equals that of the buses 1. This difference in frequencies may be chosen as small as conditions may require. Upon closure of contact 10 the circuit of relay 5 is partially closed. It remains only for relay 8 to close contact 9, when relay 5 will be energized. The fact that contact 10 closes somewhat before the frequency of generator 2 reaches that of buses 1, insures that from the time when the contact 10 closes and during the period when the difference in frequencies is within safe limits, the generator 2 and the buses 1 will be in phase at least once and a long enough time to effectively energize relay 8, and the relay 5 will consequently be energized at the most efficient time for the connection of the generator 2 to the buses 1. When the relay 5 is energized it closes a holding circuit by means of contact 12, the relay 5 being then directly energized from transformer 7 instead of through contacts 9 and 10. The energization of relay 5 of course closes contact 6 and thereby energizes coil 4 whereby the switch 3 is closed and the generator connected to the buses.

An advantage of causing the closure of the contacts responsive to the difference in frequency between the generator and the buses just before the generator frequency equals that of the buses is that the generator will pull into step with the buses with the prime mover assisting that action. If the ratios of gears 21—22 and 24—25 were the same, the generator would not be connected to the buses until the frequency of the generator had risen above that of the buses. In pulling the generator into step with the buses it would be necessary then for that action to be against the prime mover.

In the modification shown in Fig. 3 the transformers 29 and 30 have been eliminated. The parts in this figure corresponding to those in Fig. 1 have been given the same reference numerals. The neutral points of the secondaries of transformers 14, 17 which supply the synchronous motors 13, 16, are here shown connected by a conductor 33. The relay coil 8 is connected in series with the contact 10 and this circuit is here shown as connected between terminals of the transformer secondaries 34, 35 which are fed by corresponding phases of the generator and the buses. The relay 8 is consequently not energized until contact 10 is closed and it will not pump up and down as the generator is nearing synchronous speed.

It should be understood that it is not desired to limit the invention claimed to the exact details of construction and operation herein shown and described, for obvious modifications may occur to persons skilled in the art.

It is claimed and desired to secure by Letters Patent:

1. In a system of A. C. distribution, an A. C. generator, means responsive to the difference in frequency only between said system and said generator, means responsive to substantial equality in phase between said system and said generator, and means jointly responsive to the aforesaid two means for connecting said generator to said system.

2. In a system of an A. C. distribution, an A. C. generator, means effectively actuated when the frequency of said generator is slightly lower than that of said system, means responsive to substantial equality in phase between said system and said generator, and means jointly responsive to the aforesaid two means for connecting said generator to said system.

3. In a system of A. C. distribution, an A. C. generator, a synchronous motor fed by said generator, another synchronous motor fed by said distribution system, differential gearing driven by said motor, means for actuating an electrical contact in response to said gearing when the speed of said first named motor is a predetermined amount less than that of said second named motor, and means whereby said contact is maintained in its actuated position as long as the speed of said first named motor remains above said speed required for said actuation of said contact.

4. In a system of A. C. distribution, an A. C. generator, a synchronous motor fed by said generator, another synchronous motor fed by said distribution system, differential gearing driven by said motors, means for actuating an electrical contact in response to said gearing when the speed of said first named motor is a predetermined amount less than that of said second named motor, means responsive to substantial equality in phase between said system and said generator, and means jointly responsive to said contact and said phase responsive means for connecting said generator to said system.

5. In a system of distribution, an A. C. generator, a differential gearing, means connected to said generator and to one of the elements of said differential gearing for running said element at a predetermined speed when the frequency of said generator has a predetermined value, and means connected to said distribution system and to another element of said differential gearing for running said other element at a predetermined speed than said first named element when the frequency of said distribution system is the same as that of said generator, and means responsive to said differential gearing for connecting said generator to said distribution system.

6. In a system of A. C. distribution, an A. C. generator, means for connecting said generator to said distribution system, including a relay responsive to the difference in frequency only between said system and said generator, a relay responsive to substantial equality in phase between said system and said generator, and means controlled jointly by said relays.

7. In a system of A. C. distribution, an A. C. generator, means for connecting said generator to said distribution system including means responsive to the difference in frequency between said system and said generator for closing contacts in a control circuit as said generator is coming up to normal speed and just before it reaches normal speed, and means responsive to equality in phase between said generator and said system for closing contacts in said control circuit when said generator and system are in phase.

8. In a system of A. C. distribution, an A. C. generator, means for connecting said generator to said distribution system including transformers fed from said generator and said system respectively, means responsive to frequency only connected to said transformers, and phase responsive means connected to said transformers.

9. In a system of A. C. distribution, an A. C. generator, means for connecting said generator to said distribution system including means responsive to the frequencies of said generator and said system, means responsive to substantial equality in phase between said generator and said system, and means controlled by said frequency responsive means for preventing actuation of said phase responsive means until said frequency responsive means has been effectively actuated.

10. In a system of A. C. distribution, an A. C. generator, means for connecting said generator to said distribution system including means responsive to the frequencies of said generator and said system, means including a circuit connectible to be influenced by electromotive forces generated by said generator and system respectively, means in said circuit responsive to substantial equality of phase as between said electromotive forces, a contact in said circuit, and means controlled by said frequency responsive means for controlling said contact.

11. In a system of A. C. distribution, an A. C. generator, means for connecting said generator to said distribution system including means responsive to the frequencies of said generator and said system, electro-responsive means adapted to be actuated whenever there is substantial equality of phase between said generator and system, means for preventing actuation of said phase responsive means before the difference in said frequencies reaches a predetermined value, and means controlled by said frequency responsive means for controlling said last named means.

12. In a system of A. C. distribution, an A. C. generator, a transformer having its primary connected to said generator, a transformer having its primary connected to said system, means responsive to the frequency of said generator and said system connected to the secondaries of said transformers, means other than said frequency responsive means responsive to substantial equality of phase between said generator and system including a circuit having a connection to the secondaries of said transformers respectively, and means controlled by said frequency responsive means for controlling said circuit.

13. In a system of A. C. distribution, an A. C. generator, a transformer having its primary connected to said generator, a transformer having its primary connected to said system, a pair of synchronous motors connected respectively to the secondaries of said transformers, a differential gearing driven by said motors, means responsive to substantial equality of phase between said generator and said system including a circuit having a connection to the secondaries of said transformers respectively, and means controlled by said differential gearing for controlling said circuit.

14. In a system of A. C. distribution, an A. C. generator, means responsive to the frequencies of said generator and said system, a circuit having a connection to said generator and said system respectively for carrying current when said generator and system are substantially in phase, an electro-magnetic relay in said circuit, a contact in said circuit, means controlled by said frequency responsive means for controlling said contact and means controlled by said electromagnetic relay for causing the connection of said generator to said system.

In testimony whereof, the signature of the inventor is affixed hereto.

HENRY V. NYE.

CERTIFICATE OF CORRECTION.

Patent No. 1,685,747.             Granted September 25, 1928, to

HENRY V. NYE.

It is hereby certified that error appears in the printed specification of the above numbered patent requiring correction as follows: Page 3, line 62, claim 5, after the words "at a" insert the word "slower"; and that the said Letters Patent should be read with this correction therein that the same may conform to the record of the case in the Patent Office.

Signed and sealed this 20th day of November, A. D. 1928.

(Seal)                                             M. J. Moore,
                                                    Acting Commissioner of Patents.